United States Patent
Shim et al.

(10) Patent No.: US 8,992,371 B1
(45) Date of Patent: Mar. 31, 2015

(54) PLANETARY GEAR TRAIN OF AUTOMATIC TRANSMISSION FOR VEHICLE

(71) Applicant: Hyundai Motor Company, Seoul (KR)

(72) Inventors: Hyu Tae Shim, Hwaseong-Si (KR); Jinseok Kim, Seoul (KR); Kangsoo Seo, Yongin-si (KR); Jin Hee Lee, Seongnam-si (KR); Myonghoon Noh, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/144,379

(22) Filed: Dec. 30, 2013

(30) Foreign Application Priority Data

Oct. 18, 2013 (KR) .......................... 10-2013-0124730

(51) Int. Cl.
*F16H 3/62* (2006.01)
*F16H 3/66* (2006.01)

(52) U.S. Cl.
CPC .......... *F16H 3/66* (2013.01); *F16H 2200/0073* (2013.01); *F16H 2200/2048* (2013.01); *F16H 2200/2012* (2013.01)
USPC ............................ 475/276; 475/271; 475/281

(58) Field of Classification Search
USPC ........................... 475/271, 275, 276, 280, 281
See application file for complete search history.

(56) References Cited

U.S. PATENT DOCUMENTS

| | | | |
|---|---|---|---|
| 8,152,683 B2 | 4/2012 | Phillips | |
| 8,591,376 B1 * | 11/2013 | Shim et al. | 475/276 |
| 2008/0280721 A1 * | 11/2008 | Seo | 475/276 |
| 2009/0247351 A1 * | 10/2009 | Seo et al. | 475/275 |
| 2009/0280947 A1 * | 11/2009 | Seo et al. | 475/276 |
| 2010/0184556 A1 * | 7/2010 | Kim | 475/276 |
| 2011/0294617 A1 * | 12/2011 | Seo et al. | 475/275 |
| 2012/0004066 A1 * | 1/2012 | Seo et al. | 475/275 |
| 2012/0270694 A1 * | 10/2012 | Seo et al. | 475/276 |
| 2012/0302393 A1 * | 11/2012 | Seo et al. | 475/276 |
| 2012/0302394 A1 * | 11/2012 | Seo et al. | 475/276 |
| 2013/0072342 A1 * | 3/2013 | Shim et al. | 475/276 |

FOREIGN PATENT DOCUMENTS

| | | |
|---|---|---|
| JP | 2006-349153 A | 12/2006 |
| JP | 2013-68320 A | 4/2013 |
| KR | 10-2013-0031456 A | 3/2013 |
| KR | 10-2013-0032962 A | 4/2013 |
| KR | 10-1317142 B1 | 10/2013 |

* cited by examiner

*Primary Examiner* — Derek D Knight
(74) *Attorney, Agent, or Firm* — Morgan, Lewis & Bockius LLP

(57) ABSTRACT

A planetary gear train of an automatic transmission for a vehicle include: an input shaft; an output shaft; a first compound planetary gear set combining first and second planetary gear sets and firstly changing torque input through one input path and two variable input paths into six speeds; a second compound planetary gear set combining third and fourth planetary gear sets, secondly changing the six speeds a rotation speed of the input shaft input through one variable input path into eleven forward speeds and reverse speed, and finally outputting the changed rotation speed; and friction members including clutches interposed between two rotation shafts or between a rotation shaft and the input shaft, and brakes interposed between a rotation shaft and a transmission housing.

8 Claims, 3 Drawing Sheets

FIG. 2

|     | C1 | C2 | C3 | C4 | B1 | B2 | B3 | F1 |
|-----|----|----|----|----|----|----|----|----|
| D1  | ●  |    |    |    | ●  |    | ●  | ○  |
| D2  | ●  |    |    |    |    | ●  | ●  |    |
| D3  | ●  | ●  |    |    |    |    | ●  |    |
| D4  |    | ●  |    |    |    | ●  | ●  |    |
| D5  |    | ●  | ●  |    |    |    | ●  |    |
| D6  |    | ●  | ●  |    |    | ●  |    |    |
| D7  | ●  | ●  | ●  |    |    |    |    |    |
| D8  | ●  |    | ●  |    |    | ●  |    |    |
| D9  | ●  |    | ●  |    | ●  |    |    |    |
| D10 |    |    | ●  |    | ●  | ●  |    |    |
| D11 |    |    | ●  | ●  | ●  |    |    |    |
| REV |    |    |    | ●  | ●  |    | ●  |    |

US 8,992,371 B1

PLANETARY GEAR TRAIN OF AUTOMATIC TRANSMISSION FOR VEHICLE

CROSS-REFERENCE TO RELATED APPLICATION

The present application claims priority of Korean Patent Application Number 10-2013-0124730 filed Oct. 18, 2013, the entire contents of which application is incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle which can improve power delivery performance and fuel economy.

2. Description of Related Art

Typically, multi-shifts mechanism of an automatic transmission is achieved by combining a plurality of planetary gear sets.

The planetary gear sets receive torque from a torque converter and change and transmit the torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

Though achieving the same number of speeds, the planetary gear train has a different operating mechanism according to a connection between rotational elements (i.e., sun gear, planet carrier, and ring gear).

In addition, the planetary gear train has different features such a durability, power delivery efficiency, and size depend on the layout thereof. Therefore, designs for a combining structure of a gear train are also under continuous investigation.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and tenth-speed automatic transmissions have been developed at a good pace.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to provide a planetary gear train of an automatic transmission for a vehicle having advantages of achieving eleven forward speeds and one reverse speed by combining a plurality of planetary gear sets and a plurality of friction members, and improving power delivery performance and fuel economy by operating three friction members and minimum number of planetary gear sets at each speed.

Various aspects of the present invention provide for a planetary gear train of an automatic transmission for a vehicle that may include: an input shaft receiving torque of an engine; an output shaft outputting changed torque; a first compound planetary gear set having five rotation shafts by combining first and second planetary gear sets and firstly changing torque input through one input path and two variable input paths into six speeds; a second compound planetary gear set having four rotation shaft by combining third and fourth planetary gear sets, secondly changing the six speeds input from the first compound planetary gear set and a rotation speed of the input shaft input through one variable input path into eleven forward speeds and reverse speed, and finally outputting the changed rotation speed, wherein any one rotation shaft of the first compound planetary gear set is directly connected to any one rotation shaft of the second compound planetary gear set; and friction members including clutches interposed between any two rotation shafts or between any one rotation shaft and the input shaft, and brakes interposed between any one rotation shaft and a transmission housing.

The first compound planetary gear set may be formed by combining a first planetary gear set being a single pinion planetary gear set and including a first sun gear, a first planet carrier and a first ring gear, and a second planetary gear set being a double pinion planetary gear set and including a second sun gear, a second planet carrier and a second ring gear, and may include a first rotation shaft including the first sun gear and selectively connected to the input shaft or the transmission housing, a second rotation shaft including the first planet carrier and the second planet carrier, and selectively connected to the input shaft or the transmission housing, a third rotation shaft including the first ring gear and forming an intermediate output path, a fourth rotation shaft including the second ring gear and selectively connected to the third rotation shaft, and a fifth rotation shaft including the second sun gear and directly connected to the input shaft so as to be always operated as an input element.

The second compound planetary gear set may be formed by combining a third planetary gear set being a single pinion planetary gear set and including a third sun gear, a third planet carrier and a third ring gear, and a fourth planetary gear set being a single pinion planetary gear set and including a fourth sun gear, a fourth planet carrier and a fourth ring gear, and may include a sixth rotation shaft including the third ring gear and selectively connected to the transmission housing, a seventh rotation shaft including the third planet carrier and the fourth ring gear and operated as a final output element, and an eighth rotation shaft including the fourth planet carrier and selectively connected to the input shaft, wherein the third rotation shaft further includes the third and fourth sun gear.

The friction members may include: a first clutch selectively connecting the third rotation shaft with the fourth rotation shaft; a second clutch selectively connecting the input shaft with the second rotation shaft; a third clutch selectively connecting the input shaft with the eighth rotation shaft; a fourth clutch selectively connecting the input shaft with the first rotation shaft; a first brake selectively connecting the second rotation shaft with the transmission housing; a second brake selectively connecting the first rotation shaft with the transmission housing; and a third brake selectively connecting the sixth rotation shaft with the transmission housing.

The first clutch and the first and third brakes may be operated at a first forward speed, the first clutch and the second and third brakes may be operated at a second forward speed, the first and second clutches and the third brake may be operated at a third forward speed, the second clutch and the second and third brakes may be operated at a fourth forward speed, the second and third clutches and the third brake may be operated at a fifth forward speed, the second and third clutches and the second brake may be operated at a sixth forward speed, the first, second, and third clutches may be operated at a seventh forward speed, the first and third clutches and the second brake may be operated at an eighth forward speed, the first and third clutches and the first brake may be operated at a ninth forward speed, the third clutch and the first and second brakes may be operated at a tenth forward speed, the third and fourth clutches and the first brake may be operated at an eleventh forward speed, and the fourth clutch and the first and third brakes may be operated at a reverse speed.

Various aspects of the present invention provide for a planetary gear train of an automatic transmission for a vehicle that may include: an input shaft receiving torque of an engine; an output shaft outputting changed torque; a first compound planetary gear set formed by combining a first planetary gear set being a single pinion planetary gear set and a second planetary gear set being a double pinion planetary gear set; a second compound planetary gear set formed by combining third and fourth planetary gear sets being single pinion planetary gear sets; a first rotation shaft including a first sun gear and selectively connected to the input shaft or the transmission housing; a second rotation shaft including a first planet carrier and a second planet carrier, and selectively connected to the input shaft or the transmission housing; a third rotation shaft including a first ring gear, a third sun gear and a fourth sun gear; a fourth rotation shaft including a second ring gear and selectively connected to the third rotation shaft; a fifth rotation shaft including a second sun gear and directly connected to the input shaft so as to be always operated as an input element; a sixth rotation shaft including the third ring gear and selectively connected to the transmission housing; a seventh rotation shaft including a third planet carrier and a fourth ring gear and operated as a final output element; an eighth rotation shaft including a fourth planet carrier and selectively connected to the input shaft; and friction members including clutches interposed between any two rotation shafts or between any one rotation shaft and the input shaft, and brakes interposed between any one rotation shaft and a transmission housing.

The friction members may include: a first clutch selectively connecting the third rotation shaft with the fourth rotation shaft; a second clutch selectively connecting the input shaft with the second rotation shaft; a third clutch selectively connecting the input shaft with the eighth rotation shaft; a fourth clutch selectively connecting the input shaft with the first rotation shaft; a first brake selectively connecting the second rotation shaft with the transmission housing; a second brake selectively connecting the first rotation shaft with the transmission housing; and a third brake selectively connecting the sixth rotation shaft with the transmission housing.

The first clutch and the first and third brakes may be operated at a first forward speed, the first clutch and the second and third brakes may be operated at a second forward speed, the first and second clutches and the third brake may be operated at a third forward speed, the second clutch and the second and third brakes may be operated at a fourth forward speed, the second and third clutches and the third brake may be operated at a fifth forward speed, the second and third clutches and the second brake may be operated at a sixth forward speed, the first, second, and third clutches may be operated at a seventh forward speed, the first and third clutches and the second brake may be operated at an eighth forward speed, the first and third clutches and the first brake may be operated at a ninth forward speed, the third clutch and the first and second brakes may be operated at a tenth forward speed, the third and fourth clutches and the first brake may be operated at an eleventh forward speed, and the fourth clutch and the first and third brakes may be operated at a reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to an exemplary planetary gear train according to the present invention.

DETAILED DESCRIPTION

Figure 1:
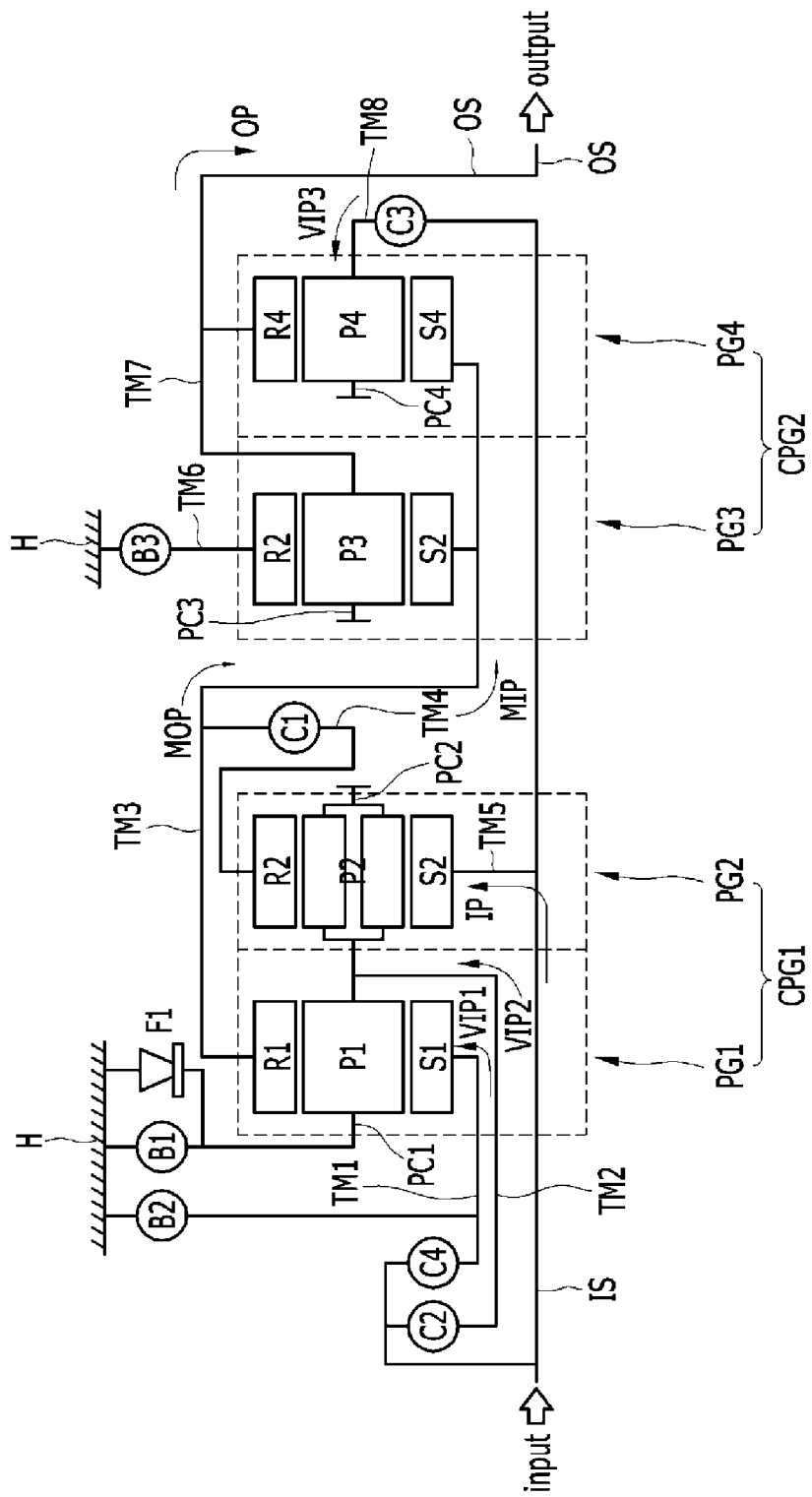
FIG. 1 is a schematic diagram of an exemplary planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings FIG. 1 is a schematic diagram of a planetary gear train according to various embodiments of the present invention.

Referring to FIG. 1, a planetary gear train according to various embodiments of the present invention includes first, second, third and fourth planetary gear sets PG1, PG2, PG3 and PG4 disposed on the same axis, an input shaft IS, an output shaft OS, eight rotation shafts TM1-TM8 directly connecting rotation elements of the first, second, third and fourth planetary gear sets PG1, PG2, PG3 and PG4, seven friction members C1-C4 and B1-B3 and a transmission housing H.

A torque input from the input shaft IS is changed by the first, second, third and fourth planetary gear sets PG1, PG2, PG3 and PG4, and the changed torque is output through the output shaft OS.

In addition, the planetary gear sets are disposed in a sequence of the first, second, third and fourth planetary gear sets PG1, PG2, PG3 and PG4 from a front portion close to an engine to a rear portion.

The input shaft IS is an input member, and torque from a crankshaft of the engine is changed through a torque converter and is input to the input shaft IS.

The output shaft OS is an output member and drives a driving wheel through a differential apparatus.

The first planetary gear set PG1 is a single pinion planetary gear set, and includes a first sun gear S1, a first planet carrier PC1 rotatably supporting a first pinion P1 externally meshed with the first sun gear S1, and a first ring gear R1 internally meshed with the first pinion P1 as rotation elements thereof.

The second planetary gear set PG2 is a double pinion planetary gear set, and includes a second sun gear S2, a second planet carrier PC2 rotatably supporting a second pinion P2 externally meshed with the second sun gear S2, and a second ring gear R2 internally meshed with the second pinion P2 as rotation elements thereof.

The third planetary gear set PG3 is a single pinion planetary gear set, and includes a third sun gear S3, a third planet carrier PC3 rotatably supporting a third pinion P3 externally meshed with the third sun gear S3, and a third ring gear R3 internally meshed with the third pinion P3.

The fourth planetary gear set PG4 is a single pinion planetary gear set, and includes a fourth sun gear S4, a fourth planet carrier PC4 rotatably supporting a fourth pinion P4 externally meshed with the fourth sun gear S4, and a fourth ring gear R4 internally meshed with the fourth pinion P4 as rotation elements thereof.

The first, second, third and fourth planetary gear sets PG1, PG2, PG3 and PG4 are combined as two compound planetary gear sets CPG1 and CPG2, and changes a rotation speed of the input shaft IS into eleven forward speeds.

The first compound planetary gear set CPG1 is formed by combining the first and second planetary gear sets PG1 and PG2, and the second compound planetary gear set CPG2 is formed by combining the third and fourth planetary gear sets PG3 and PG4.

The first compound planetary gear set CPG1 has five rotation elements by connecting the first planet carrier PC1 with the second planet carrier PC2.

In addition, the second compound planetary gear set CPG2 has four rotation elements by directly connecting the third sun gear S3 with the fourth sun gear S4 and directly connecting the third planet carrier PC3 with the fourth ring gear R4.

In addition, one rotation element of the first compound planetary gear set CPG1 is directly connected to one rotation element of the second compound planetary gear set CPG2 such that the planetary gear train has eight rotation shafts TM1-TM8.

The first rotation shaft TM1 includes the first sun gear S1 and is selectively connected to the input shaft IS and the transmission housing H.

The second rotation shaft TM2 includes the first planet carrier PC1 and the second planet carrier PC2, and is selectively connected to the input shaft IS and the transmission housing H.

The third rotation shaft TM3 includes the first ring gear R1 and the third and fourth sun gears S3 and S4.

The fourth rotation shaft TM4 includes the second ring gear R2 and is selectively connected to the third rotation shaft TM3.

The fifth rotation shaft TM5 includes the second sun gear S2 and is directly connected to the input shaft IS.

The sixth rotation shaft TM6 includes the third ring gear R3 and is selectively connected to the transmission housing H.

The seventh rotation shaft TM7 includes the third planet carrier PC3 and the fourth ring gear R4, and is directly connected to the output shaft OS.

The eighth rotation shaft TM8 includes the fourth planet carrier PC4 and is selectively connected to the input shaft IS.

Four clutches C1, C2, C3, and C4 are disposed between rotation shafts or between rotation shafts and the input shaft IS.

In addition, three brakes B1, B2, and B3 is disposed between rotation shafts and the transmission housing H.

The first clutch C1 is interposed between the third rotation shaft TM3 and the fourth rotation shaft TM4, and selectively causes the third and fourth rotation shafts TM3 and TM4 to rotate integrally.

The second clutch C2 is interposed between the input shaft IS and the second rotation shaft TM2, and selectively operates the second rotation shaft TM2 as an input element.

The third clutch C3 is interposed between the input shaft IS and the eighth rotation shaft TM8, and selectively operates the eighth rotation shaft TM8 as an input element.

The fourth clutch C4 is interposed between the input shaft IS and the first rotation shaft TM1, and selectively operates the first rotation shaft TM1 as an input element.

The first brake B1 is interposed between the second rotation shaft TM2 and the transmission housing H, and selectively operates the second rotation shaft TM2 as a fixed element.

The second brake B2 is interposed between the first rotation shaft TM1 and the transmission housing H, and selectively operates the first rotation shaft TM1 as a fixed element.

The third brake B3 is interposed between the sixth rotation shaft TM6 and the transmission housing H, and selectively operates the sixth rotation shaft TM6 as a fixed element.

In addition, a one-way clutch F1 disposed in parallel with the first brake B1 between the second rotation shaft TM2 and the transmission housing H is further included.

The first, second, and third clutches C1, C2, and C3 and the first and second brakes B1 and B2 are applied to the first compound planetary gear set CPG1.

Therefore, the first compound planetary gear set CPG1 changes torque input through an input path IP and first and second variable input paths VIP1 and VIP2 into six speeds by operation of the first and second brakes B1 and B2 and the first clutch C1 and transmits the six speeds to the second compound planetary gear set CPG2 through an intermediate output path MOP.

At this time, the six speeds include two reduced speeds, speed of 0, speed of 1 the same as the input shaft IS, one increased speed, and one inverse speed.

In addition, the third clutch C3 and the third brake B3 are applied to the second compound planetary gear set CPG2.

Therefore, the second compound planetary gear set CPG2 changes torque input through an intermediate input path MIP and a third variable input path VIP3 into eleven forward speeds and one reverse speed by operation of the third brake B3, and outputs the changed torque through a final output path OP.

The friction members consisting of first, second, third, and fourth clutches C1, C2, C3, and C4 and the first, second, and third brakes B1, B2, and B3 are conventional multi-plate friction members of wet type that are operated by hydraulic pressure FIG. 2 is an operational chart of friction members at each shift-speed applied to a planetary gear train according to various embodiments of the present invention.

Referring to FIG. 2, three friction members are operated at each speed in the planetary gear train according to various embodiments of the present invention.

The first clutch C1, the first brake B1, and the third brake B3 are operated at a first forward speed D1.

The first clutch C1, the second brake B2, and the third brake B3 are operated at a second forward speed D2.

The first clutch C1, the second clutch C2, and the third brake B3 are operated at a third forward speed D3.

The second clutch C2, the second brake B2, and the third brake B3 are operated at a fourth forward speed D4.

The second clutch C2, the third clutch C3, and the third brake B2 are operated at a fifth forward speed D5.

The second clutch C2, the third clutch C3, and the second brake B2 are operated at a sixth forward speed D6.

The first clutch C1, the second clutch C2, and the third clutch C3 are operated at a seventh forward speed D7.

The first clutch C1, the third clutch C3, and the second brake B2 are operated at an eighth forward speed D8.

The first clutch C1, the third clutch C3, and the first brake B1 are operated at a ninth forward speed D9.

The third clutch C3, the first brake B1, and the second brake B2 are operated at a tenth forward speed D10.

The third clutch C3, the fourth clutch C4, and the first brake B1 are operated at an eleventh forward speed D11.

The fourth clutch C4, the first brake B1, and the third brake B3 are operated at a reverse speed REV.

It is explained that the first clutch C1 and the second and third brakes B2 and B3 are operated at the first forward speed D1, but the one-way clutch F1 instead of the first brake B1 is operated at normal driving.

Figure 3:
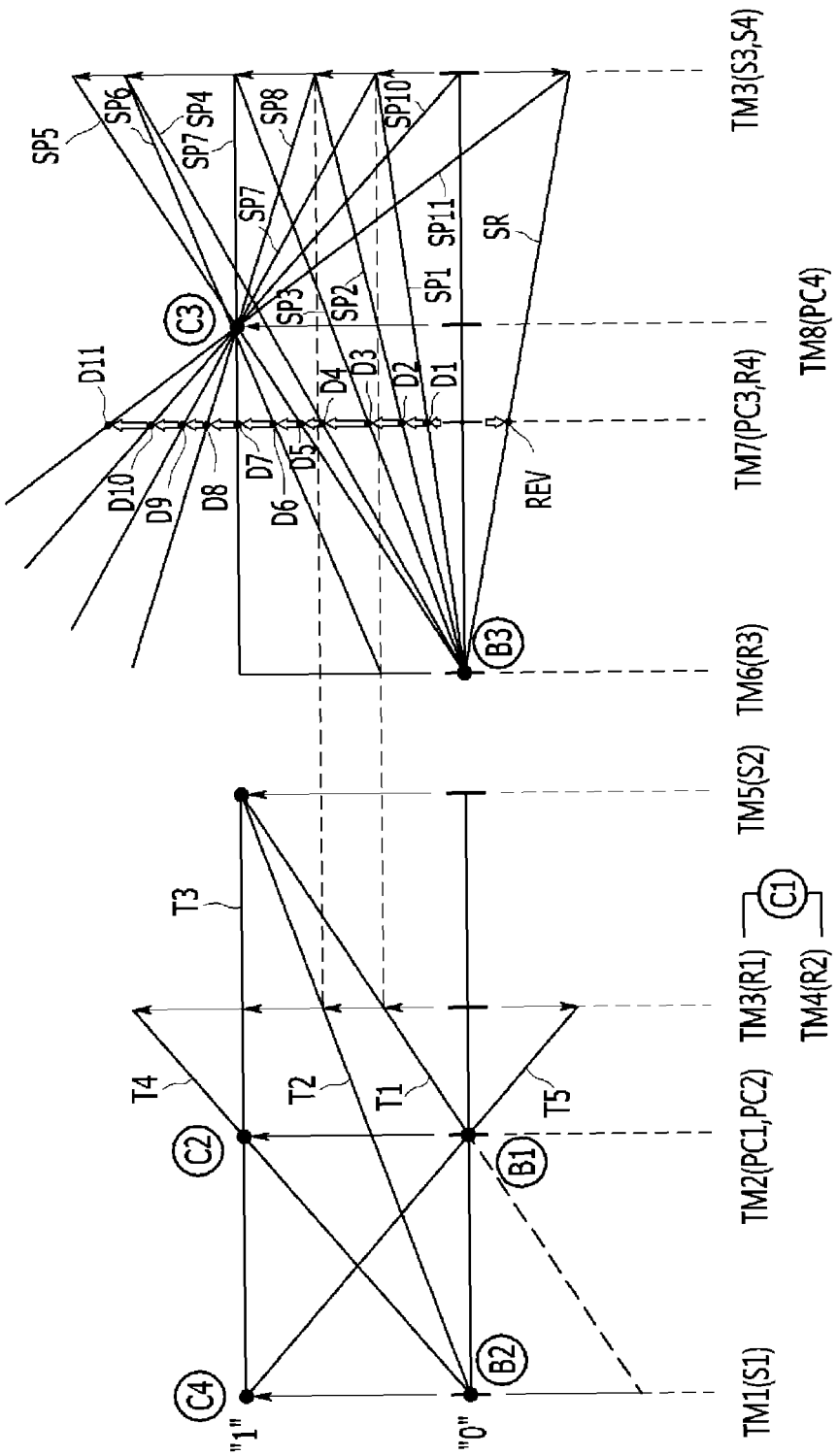
FIG. 3 is a lever diagram for an exemplary planetary gear train according to the present invention.

FIG. 3 is a lever diagram for a planetary gear train according to various embodiments of the present invention, and illustrates shift processes of the planetary gear train according to various embodiments of the present invention by lever analysis method.

Referring to FIG. 3, a lower horizontal line represents a rotation speed of "0", and an upper horizontal line represents a rotation speed of "1.0", that is the same rotation speed as the input shaft IS.

Four vertical lies corresponding to the first compound planetary gear set CPG1 are set as the first rotation shaft TM1, the second rotation shaft TM2, the third rotation shaft TM3 or the fourth rotation shaft TM4, and the fifth rotation shaft TM5 from the left to the right in the drawing.

Herein, distances among the first rotation shaft TM1, the second rotation shaft TM2, the third rotation shaft TM3 or the fourth rotation shaft TM4, and the fifth rotation shaft TM5 are set according to gear ratios (teeth number of sun gear/teeth number of ring gear) of the first and second planetary gear sets PG1 and PG2.

Since the third rotation shaft TM3 and the fourth rotation shaft TM4 are integrally rotated when the first clutch C1 is operated, the third rotation shaft TM3 and the fourth rotation shaft TM4 are disposed on one vertical line.

In addition, four vertical lines corresponding to the second compound planetary gear set CPG2 are set as the sixth rotation shaft TM6, the seventh rotation shaft TM7, the eighth rotation shaft TM8, and the third rotation shaft TM3 from the left to the right in the drawing.

Herein, distances among the sixth rotation shaft TM6, the seventh rotation shaft TM7, the eighth rotation shaft TM8, and the third rotation shaft TM3 are set according to gear ratios (teeth number of sun gear/teeth number of ring gear) of the third and fourth planetary gear sets PG3 and PG4.

Hereinafter, referring to FIG. 2 and FIG. 3, each speed of the planetary gear train according to various embodiments of the present invention will be described in detail.

First Forward Speed

The first clutch C1 and the first and third brakes B1 and B3 are operated at the first forward speed D1.

As shown in FIG. 3, the rotation speed of the input shaft IS is input to the fifth rotation shaft TM5, and the second rotation shaft TM2 is operated as the fixed element by operation of the first brake B1.

Therefore, the rotation elements of the first compound planetary gear set CPG1 form a first speed line T1 and a first speed is output through the third rotation shaft TM3.

In a state that the first speed is input to the third rotation shaft TM3, the sixth rotation shaft TM6 is operated as the fixed element by operation of the third brake B3. Therefore, the rotation elements of the second compound planetary gear set CPG2 form a first shift line SP1.

The first shift line SP1 crosses the vertical line of the seventh rotation shaft TM7 that is the output element, and D1 is output.

Second Forward Speed

The first brake B1 that was operated at the first forward speed D1 is released and the second brake B2 is operated at the second forward speed D2.

As shown in FIG. 3, the rotation speed of the input shaft IS is input to the fifth rotation shaft TM5, and the first rotation shaft TM1 is operated as the fixed element by operation of the second brake B2.

Therefore, the rotation elements of the first compound planetary gear set CPG1 form a second speed line T2 and a second speed is output through the third rotation shaft TM3.

In a state that the second speed is input to the third rotation shaft TM3, the sixth rotation shaft TM6 is operated as the fixed element by operation of the third brake B3. Therefore, the rotation elements of the second compound planetary gear set CPG2 form a second shift line SP2.

The second shift line SP2 crosses the vertical line of the seventh rotation shaft TM7 that is the output element, and D2 is output.

Third Forward Speed

The second brake B2 that was operated at the second forward speed D2 is released and the second clutch C2 is operated at the third forward speed D3.

As shown in FIG. 3, the rotation speed of the input shaft IS is input to the fifth rotation shaft TM5, and the rotation speed of the input shaft IS is also input to the second rotation shaft TM2 by operation of the second clutch C2. Therefore, the first compound planetary gear set CPG1 becomes a direct-coupling state and the rotation elements of the first compound planetary gear set CPG1 form a third speed line T3. Therefore, a third speed that is the same as the rotation speed of the input shaft IS is output through the third rotation shaft TM3.

In addition, in a state that the third speed in input to the third rotation shaft TM3, the sixth rotation shaft TM6 is operated as the fixed element by operation of the third brake B3. Therefore, the rotation elements of the second compound planetary gear set CPG2 form a third shift line SP3.

The third shift line SP3 crosses the vertical line of the seventh rotation shaft TM7 that is the output element, and D3 is output.

Fourth Forward Speed

The first clutch C1 that was operated at the third forward speed D3 is released and the second brake B2 is operated at the fourth forward speed D4.

As shown in FIG. 3, the rotation speed of the input shaft IS is input to the fifth rotation shaft TM5, and the rotation speed of the input shaft IS is also input to the second rotation shaft TM2 by operation of the second clutch C2.

At this time, the rotation speed of the input shaft IS is input to the second rotation shaft TM2 and the first rotation shaft TM1 is operated as the fixed element by operation of the second brake B2 in a state that the first clutch C1 is released. Therefore, the rotation elements of the first compound planetary gear set CPG1 form a fourth speed line T4, and a fourth speed is output through the third rotation shaft TM3.

In a state that the fourth speed is input to the third rotation shaft TM3, the sixth rotation shaft TM6 is operated as the fixed element by operation of the third brake B3. Therefore, the rotation elements of the second compound planetary gear set CPG2 form a fourth shift line SP4.

The fourth shift line SP4 crosses the vertical line of the seventh rotation shaft TM7 that is the output element, and D4 is output.

Fifth Forward Speed

The second brake B2 that was operated at the fourth forward speed D4 is released and the third clutch C3 is operated at the fifth forward speed D5.

As shown in FIG. 3, the rotation speed of the input shaft IS is input to the fifth rotation shaft TM5, and the rotation speed of the input shaft IS is also input to the second rotation shaft TM2 by operation of the second clutch C2.

At this time, the first compound planetary gear set CPG1 does not affect on shifting since the first and second brakes B1 and B2 are not operated.

However, the rotation speed of the input shaft IS is input to the eighth rotation shaft TM8 by operation of the third clutch C3, and the sixth rotation shaft TM6 is operated as the fixed element by operation of the third brake B3. Therefore, the rotation elements of the second compound planetary gear set CPG2 form a fifth shift line SP5.

The fifth shift line SP5 crosses the vertical line of the seventh rotation shaft TM7 that is the output element, and D5 is output.

Sixth Forward Speed

The third brake B3 that was operated at the fifth forward speed D5 is released and the second brake B2 is operated at the sixth forward speed D6.

As shown in FIG. 3, the rotation speed of the input shaft IS is input to the fifth rotation shaft TM5, and the rotation speed of the input shaft IS is also input to the second rotation shaft TM2 by operation of the second clutch C2.

At this time, the rotation speed of the input shaft IS is input to the second rotation shaft TM2 and the first rotation shaft TM1 is operated as the fixed element by operation of the second brake B2 in a state that the first clutch C1 is released. Therefore, the rotation elements of the first compound planetary gear set CPG1 form the fourth speed line T4, and the fourth speed is output through the third rotation shaft TM3.

In a state that the fourth speed is input to the third rotation shaft TM3, the rotation speed of the input shaft IS is input to the eighth rotation shaft TM8 by operation of the third clutch C3. Therefore, the rotation elements of the second compound planetary gear set CPG2 form a sixth shift line SP6.

The sixth shift line SP6 crosses the vertical line of the seventh rotation shaft TM7 that is the output element, and D6 is output.

Seventh Forward Speed

The second brake B that was operated at the sixth forward speed D6 is released and the first clutch C1 is operated at the seventh forward speed D7.

As shown in FIG. 3, the rotation speed of the input shaft IS is input to the fifth rotation shaft TM5, and the rotation speed of the input shaft IS is also input to the second rotation shaft TM2 by operation of the second clutch C2. Therefore, the first compound planetary gear set CPG1 becomes a direct-coupling state and the rotation elements of the first compound planetary gear set CPG1 form the third speed line T3. Therefore, the third speed is output through the third rotation shaft TM3.

In addition, in a state that the third speed in input to the third rotation shaft TM3, the rotation speed of the input shaft IS is input to the eighth rotation shaft TM8 by operation of the third clutch C3. Therefore, the second compound planetary gear set CPG2 becomes a direct-coupling state and the rotation elements of the second compound planetary gear set CPG2 form a seventh shift line SP7. Therefore, D7 is output.

Eighth Forward Speed

The second clutch C2 that was operated at the seventh forward speed D7 is released and the second brake B2 is operated at the eighth forward speed D8.

As shown in FIG. 3, the rotation speed of the input shaft IS is input to the fifth rotation shaft TM5, and the first rotation shaft TM1 is operated as the fixed element by operation of the second brake B2.

Therefore, the rotation elements of the first compound planetary gear set CPG1 form the second speed line T2 and the second speed is output through the third rotation shaft TM3.

In a state that the second speed is input to the third rotation shaft TM3, the rotation speed of the input shaft IS is input to the eighth rotation shaft TM8 by operation of the third clutch C3. Therefore, the rotation elements of the second compound planetary gear set CPG2 form an eighth shift line SP8.

The eighth shift line SP8 crosses the vertical line of the seventh rotation shaft TM7 that is the output element, and D8 is output.

Ninth Forward Speed

The second brake B2 that was operated at the eighth forward speed D8 is released and the first brake B1 is operated at the ninth forward speed D9.

As shown in FIG. 3, the rotation speed of the input shaft IS is input to the fifth rotation shaft TM5, and the second rotation shaft TM2 is operated as the fixed element by operation of the first brake B1.

Therefore, the rotation elements of the first compound planetary gear set CPG1 form the first speed line T1 and the first speed is output through the third rotation shaft TM3.

In a state that the first speed is input to the third rotation shaft TM3, the rotation speed of the input shaft IS is input to the eighth rotation shaft TM8 by operation of the third clutch C3. Therefore, the rotation elements of the second compound planetary gear set CPG2 form a ninth shift line SP9.

The ninth shift line SP9 crosses the vertical line of the seventh rotation shaft TM7 that is the output element, and D9 is output.

Tenth Forward Speed

The first clutch C1 that was operated at the ninth forward speed D9 is released and the second brake B2 is operated at the tenth forward speed D10.

As shown in FIG. 3, the rotation speed of the input shaft IS is input to the fifth rotation shaft TM5, and the third rotation shaft TM3 is stopped by operation of the first and second brakes B1 and B2.

In a state that the rotation speed of the input shaft IS is input to the eighth rotation shaft TM8 by operation of the third clutch C3, the third rotation shaft TM3 is stopped. Therefore, the rotation elements of the second compound planetary gear set CPG2 form a tenth shift line SP10.

The tenth shift line SP10 crosses the vertical line of the seventh rotation shaft TM7 that is the output element, and D10 is output.

Eleventh Forward Speed

The second brake B2 that was operated at the tenth forward speed D10 is released and the fourth clutch C4 is operated at the eleventh forward speed D11.

As shown in FIG. 3, the rotation speed of the input shaft IS is input to the fifth rotation shaft TM5, and the rotation speed of the input shaft IS is also input to the first rotation shaft TM1 by operation of the fourth clutch C4.

However, the input through the fifth rotation shaft TM5 does not affect on the shifting, and the input through the first rotation shaft TM1 affects on the shifting. In addition, the second rotation shaft TM2 is stopped by operation of the first brake B1. Therefore, the rotation elements of the first compound planetary gear set CPG1 form a fifth speed line T5 and a fifth speed is output through the third rotation shaft TM3.

In a state that the fifth speed is input to the third rotation shaft TM3, the rotation speed of the input shaft IS is input to the eighth rotation shaft TM8 by operation of the third clutch C3. Therefore, the rotation elements of the second compound planetary gear set CPG2 form an eleventh shift line SP11.

The eleventh shift line SP11 crosses the vertical line of the seventh rotation shaft TM7 that is the output element, and D9 is output.

Reverse Speed

The fourth clutch C4 and the first and third brakes B1 and B3 are operated at the reverse speed REV.

As shown in FIG. 3, the rotation speed of the input shaft IS is input to the fifth rotation shaft TM5, and the rotation speed of the input shaft IS is also input to the first rotation shaft TM1 by operation of the fourth clutch C4.

However, the input through the fifth rotation shaft TM5 does not affect on the shifting, and the input through the first rotation shaft TM1 affects on the shifting. In addition, the second rotation shaft TM2 is stopped by operation of the first brake B1. Therefore, the rotation elements of the first compound planetary gear set CPG1 form the fifth speed line T5 and the fifth speed is output through the third rotation shaft TM3.

In a state that the fifth speed is input to the third rotation shaft TM3, the sixth rotation shaft TM6 is operated as the fixed element by operation of the third brake B3. Therefore, the rotation elements of the second compound planetary gear set CPG2 form a revere shift line SR.

The reverse shift line SR crosses the vertical line of the seventh rotation shaft TM7 that is the output element, and REV is output.

According to various embodiments of the present invention, eleven forward speeds and one reverse speed may be achieved by combining four planetary gear sets PG1, PG2, PG3, and PG4 into two compound planetary gear sets CPG1 and CPG2 and controlling four clutches C1, C2, C3, and C4 and three brakes B1, B2, and B3.

That is, the first compound planetary gear set CPG1 firstly changes the rotation speed of the input shaft IS into two reduced speed, speed of 0, speed of 1 the same as the input shaft IS, one increased speed, and one inverse speed, and the second compound planetary gear set CPG2 secondary changes the output of the first compound planetary gear set CPG1 and the rotation speed of the input shaft IS into eleven forward speeds and one reverse speed.

The planetary gear train according to various embodiments of the present invention may improve power delivery efficiency and fuel economy by achieving multiple-speeds of the automatic transmission.

Since at least three friction members are operated at each speed, the number of the friction members that are not operated can be reduced. Therefore, drag loss may be reduced and power delivery efficiency and fuel economy may be further improved.

In addition, all the four planetary gear sets PG1, PG2, PG3, and PG4 are not involved in each speed, but one to four planetary gear sets are involved in each speed in the planetary gear train according to various embodiments of the present invention.

That is, the second and third planetary gear sets PG2 and PG3 are involved in the first forward speed, the first, second, and third planetary gear sets PG1, PG2, and PG3 are involved in the second forward speed, the third planetary gear set PG3 is involved in the third forward speed, and the first and third planetary gear sets PG1 and PG3 are involved in the fourth forward speed.

In addition, the third and fourth planetary gear sets PG3 and PG4 are involved in the fifth forward speed, the first and fourth planetary gear sets PG1 and PG4 are involved in the sixth forward speed, and the first, second, third and fourth planetary gear sets PG1, PG2, PG3 and PG4 are involved in the seventh forward speed.

In addition, the first, second, and fourth planetary gear sets PG1, PG2, and PG4 are involved in the eighth forward speed, the second and fourth planetary gear sets PG2 and PG4 are involved in the ninth forward speed, the fourth planetary gear set PG4 is involved in the tenth forward speed, and the first and fourth planetary gear sets PG1 and PG4 are involved in the eleventh forward speed.

In addition, the first and third planetary gear sets PG1 and PG3 are involved in the reverse speed.

Since the number of the planetary gear sets involved in each speed is minimized, power loss may be also minimized.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
    an input shaft receiving torque of an engine;
    an output shaft outputting changed torque;
    a first compound planetary gear set having five rotation shafts, the first compound planetary gear set formed by combining first and second planetary gear sets and firstly changing torque input through one input path and two variable input paths into six speeds;
    a second compound planetary gear set having four rotation shafts, the second compound planetary gear set formed by combining third and fourth planetary gear sets, secondly changing the six speeds input from the first compound planetary gear set and a rotation speed of the input shaft input through one variable input path into eleven forward speeds and reverse speed, and finally outputting the changed rotation speed, wherein any one rotation shaft of the first compound planetary gear set is directly connected to any one rotation shaft of the second compound planetary gear set; and
    friction members including clutches interposed between any two rotation shafts or between any one rotation shaft and the input shaft, and brakes interposed between any one rotation shaft and a transmission housing.

2. The planetary gear train of claim 1, wherein the first compound planetary gear set is formed by combining a first planetary gear set being a single pinion planetary gear set and including a first sun gear, a first planet carrier and a first ring gear, and a second planetary gear set being a double pinion planetary gear set and including a second sun gear, a second planet carrier and a second ring gear, and includes
- a first rotation shaft including the first sun gear and selectively connected to the input shaft or the transmission housing,
- a second rotation shaft including the first planet carrier and the second planet carrier, and selectively connected to the input shaft or the transmission housing,
- a third rotation shaft including the first ring gear and forming an intermediate output path,
- a fourth rotation shaft including the second ring gear and selectively connected to the third rotation shaft, and
- a fifth rotation shaft including the second sun gear and directly connected to the input shaft so as to be always operated as an input element.

3. The planetary gear train of claim 2, wherein the second compound planetary gear set is formed by combining a third planetary gear set being a single pinion planetary gear set and including a third sun gear, a third planet carrier and a third ring gear, and a fourth planetary gear set being a single pinion planetary gear set and including a fourth sun gear, a fourth planet carrier and a fourth ring gear, and includes
- a sixth rotation shaft including the third ring gear and selectively connected to the transmission housing,
- a seventh rotation shaft including the third planet carrier and the fourth ring gear and operated as a final output element, and
- an eighth rotation shaft including the fourth planet carrier and selectively connected to the input shaft, and
wherein the third rotation shaft further includes the third and fourth sun gear.

4. The planetary gear train of claim 3, wherein the friction members comprise:
- a first clutch selectively connecting the third rotation shaft with the fourth rotation shaft;
- a second clutch selectively connecting the input shaft with the second rotation shaft;
- a third clutch selectively connecting the input shaft with the eighth rotation shaft;
- a fourth clutch selectively connecting the input shaft with the first rotation shaft;
- a first brake selectively connecting the second rotation shaft with the transmission housing;
- a second brake selectively connecting the first rotation shaft with the transmission housing; and
- a third brake selectively connecting the sixth rotation shaft with the transmission housing.

5. The planetary gear train of claim 4, wherein the first clutch and the first and third brakes are operated at a first forward speed,
the first clutch and the second and third brakes are operated at a second forward speed,
the first and second clutches and the third brake are operated at a third forward speed,
the second clutch and the second and third brakes are operated at a fourth forward speed,
the second and third clutches and the third brake are operated at a fifth forward speed,
the second and third clutches and the second brake are operated at a sixth forward speed,
the first, second, and third clutches are operated at a seventh forward speed,
the first and third clutches and the second brake are operated at an eighth forward speed,
the first and third clutches and the first brake are operated at a ninth forward speed,
the third clutch and the first and second brakes are operated at a tenth forward speed,
the third and fourth clutches and the first brake are operated at an eleventh forward speed, and
the fourth clutch and the first and third brakes are operated at a reverse speed.

6. A planetary gear train of an automatic transmission for a vehicle comprising:
- an input shaft receiving torque of an engine;
- an output shaft outputting changed torque;
- a first compound planetary gear set formed by combining a first planetary gear set being a single pinion planetary gear set and a second planetary gear set being a double pinion planetary gear set;
- a second compound planetary gear set formed by combining third and fourth planetary gear sets, each being single pinion planetary gear sets;
- a first rotation shaft including a first sun gear and selectively connected to the input shaft or the transmission housing;
- a second rotation shaft including a first planet carrier and a second planet carrier, and selectively connected to the input shaft or the transmission housing;
- a third rotation shaft including a first ring gear, a third sun gear and a fourth sun gear;
- a fourth rotation shaft including a second ring gear and selectively connected to the third rotation shaft;
- a fifth rotation shaft including a second sun gear and directly connected to the input shaft so as to be always operated as an input element;
- a sixth rotation shaft including the third ring gear and selectively connected to the transmission housing;
- a seventh rotation shaft including a third planet carrier and a fourth ring gear and operated as a final output element;
- an eighth rotation shaft including a fourth planet carrier and selectively connected to the input shaft; and
- friction members including clutches interposed between any two rotation shafts or between any one rotation shaft and the input shaft, and brakes interposed between any one rotation shaft and a transmission housing.

7. The planetary gear train of claim 6, the friction members comprise:
- a first clutch selectively connecting the third rotation shaft with the fourth rotation shaft;
- a second clutch selectively connecting the input shaft with the second rotation shaft;
- a third clutch selectively connecting the input shaft with the eighth rotation shaft;
- a fourth clutch selectively connecting the input shaft with the first rotation shaft;
- a first brake selectively connecting the second rotation shaft with the transmission housing;
- a second brake selectively connecting the first rotation shaft with the transmission housing; and
- a third brake selectively connecting the sixth rotation shaft with the transmission housing.

8. The planetary gear train of claim 7, wherein the first clutch and the first and third brakes are operated at a first forward speed,
the first clutch and the second and third brakes are operated at a second forward speed,
the first and second clutches and the third brake are operated at a third forward speed,
the second clutch and the second and third brakes are operated at a fourth forward speed, the second and third clutches and the third brake are operated at a fifth forward speed,
the second and third clutches and the second brake are operated at a sixth forward speed,
the first, second, and third clutches are operated at a seventh forward speed,
the first and third clutches and the second brake are operated at an eighth forward speed,
the first and third clutches and the first brake are operated at a ninth forward speed,
the third clutch and the first and second brakes are operated at a tenth forward speed,
the third and fourth clutches and the first brake are operated at an eleventh forward speed, and
the fourth clutch and the first and third brakes are operated at a reverse speed.

* * * * *